United States Patent [19]

Ritsko et al.

[11] Patent Number: 4,482,526

[45] Date of Patent: Nov. 13, 1984

[54] RECOVERY OF TUNGSTEN AND MOLYBDENUM FROM SULFUR-BEARING MATERIAL

[75] Inventors: Joseph E. Ritsko; Howard L. Acla, both of Towanda, Pa.

[73] Assignee: GTE Products Corporation, Stamford, Conn.

[21] Appl. No.: 557,022

[22] Filed: Dec. 1, 1983

[51] Int. Cl.³ ..................... C01G 39/00; C01G 41/00
[52] U.S. Cl. ...................................... 423/61; 423/53; 423/58
[58] Field of Search ............................. 423/53, 58, 61

[56] References Cited

U.S. PATENT DOCUMENTS

| | | | |
|---|---|---|---|
| 3,429,693 | 2/1969 | Bauer et al. | 423/61 |
| 3,725,524 | 4/1973 | Martin et al. | 423/61 |
| 4,320,095 | 3/1982 | Queneau et al. | 423/61 |
| 4,320,096 | 3/1982 | Queneau et al. | 423/61 |

Primary Examiner—Herbert T. Carter
Attorney, Agent, or Firm—R. E. Walter

[57] ABSTRACT

Tungsten and molybdenum are recovered from sulfur bearing material such as sulfide sludges by a pollution free process in which the sulfur bearing material is heated with agitation in an aqueous solution of sodium carbonate to form water soluble molybdenum and tungsten compounds without forming any appreciable amount of water soluble sulfur compounds. The reaction mixture is oxidized to convert partially reduced tungsten values or molybdenum values to sodium tungstate and sodium molybdate respectively. The liquid phase containing tungsten and molybdenum is separated from the solid phase containing free sulfur.

4 Claims, No Drawings

RECOVERY OF TUNGSTEN AND MOLYBDENUM FROM SULFUR-BEARING MATERIAL

BACKGROUND OF THE INVENTION

This invention relates to a process for recovering tungsten and molybdenum from sulfur bearing material without polluting the atmosphere with gases such as sulfur dioxide and without production of sludge.

In the manufacture of tungsten from ores such as scheelite, wolframite, or scrap sources, the ores or scrap are processed by one of the four following conventional methods: acid decomposition, sodium carbonate digestion, fusion with sodium carbonate, or caustic digestion. These processes produce the desired sodium tungstate with smaller amounts of sodium molybdate as the major impurity. The molybdenum is removed by the addition of the sulfide or sulfide producing compound. In general, the process consists of adding sodium hydrosulfide, (NaSH), to the digested ore solution, adjusting the pH to approximately 3.0 to 4.0, using a mineral acid to precipitate the Mo, minor amounts of W, an appreciable amount of free sulfur, and other impurities such as Fe, As, and Sb which can be present. The resulting slurry is filtered to remove the precipitate, leaving a purified sodium tungstate solution. The precipitate contains appreciable amounts of both molybdenum and tungsten, and heretofore has not been upgraded. The results in loss of tungsten and molybdenum values and attendant storage problems.

Existing methods for recovering tungsten and molybdenum from sulfides and free sulfur are (1) roasting or air oxidizing, (2) oxidizing with nitric acid, and (3) fusion with sodium hydroxide or carbonate. The disadvantage of roasting in air is the formation of sulfur dioxide which is an air pollution problem. Nitric acid is both too expensive and produces free sulfur. Sodium hydroxide or carbonate fusion of the sulfides of tungsten and molybdenum results in the formation of sodium thiotungstates and sodium thiomolybdates respectively and sodium sulfide. Thus, sulfur is not removed from tungsten and molybdenum in this process.

It is believed, therefore, that a process which enables efficient removal of tungsten and molybdenum in a usable form from sulfur bearing material without disposal and air pollution problems of sulfur is an advancement in the art.

SUMMARY OF THE INVENTION

In accordance with one aspect of this invention, this and other objects are achieved by a process in which the sulfur bearing material is heated with agitation in an aqueous solution of an alkali metal carbonate at a pH of from about 10 to about 11 at a temperature and for a time sufficient to form water soluble molybdenum and tungsten compounds without forming any appreciable amount of water soluble sulfur compounds. "The water soluble tungsten and molybdenum compounds include soluble tungstate, molybdates, thiotungstate or thiomolybdates such as sodium tungstate, sodium molybdate, sodium thiotungstate and sodium thiomolybdate." After the heating period, the pH of the resulting reaction mixture is adjusted to about 10 to about 11 with an alkali metal carbonate solution. The reaction mixture is then cooled to about 20° C. to about 25° C. The reaction mixture is then oxidized with an excess of an oxidizing agent that is theoretically required to convert any partially reduced tungsten values or molybdenum values to tungstates and molybdates respectively. "The thiotungstates and thiomolybdates are oxidized to tungstates and molybdates." The mixture is then filtered to separate the liquid phase from the solid phase. The liquid or aqueous phase can contain about 95% to about 98% of the tungsten and molybdenum as tungstates and molybdates respectively. The solid phase contains free sulfur, which can be upgraded.

DETAILED DESCRIPTION OF THE INVENTION

For a better understanding of the present invention, together with other and further objects, advantages and capabilities thereof, reference is made to the following disclosure and appended claims.

The sulfur bearing material can be the sludge remaining from the purification of leach liquors containing tungsten and molybdenum. The sulfur bearing material can contain about 30 to about 60% free sulfur and about 5 to about 20% combined tungsten and molybdenum on a dry weight basis, present essentially as sulfides. Typical compositions are about 40 to about 50% of free fulfur, and about 2 to about 10% tungsten and about 2 to about 10% molybdenum on a dry weight basis with the remainder being impurities, such as iron, manganese, and arsenic.

According to the process of this invention, the sulfur bearing materil is heated in an aqueous solution of an alkali metal carbonate at a pH of at least about 11. A typical such solution consists of about 50 parts of alkali metal carbonate dissolved in about 500 parts of water. The carbonate is in an amount which will allow the eventual recovery of tungsten and molybdenum as water soluble tungstates and molybdates respectively. A typical charge is about 200 parts of sulfur bearing material consisting of about 40 to about 60% free sulfur and about 5 to about 20% combined tungsten and molybdenum on a dry weight ratio basis, and about 250 parts of an aquous solution of alkali metal carbonate at a pH of at least about 11. Heating of the sulfur bearing material and aqueous solution of alkali metal carbonate is carried out in atmospheric pressure in any reactor in which a mixing device can be used. Heating is carried out at a temperature and for a length of time sufficient to render the tungsten and molybdenum in a soluble form without dissolving any appreciable amounts of sulfur. Heating temperatures are from about 60° C. to about 100° C., with about 80° C. to about 85° C. being preferred. Heating times are from about 2 to about 6 hours, with about 3 to about 4 hours being preferred. If after heating the pH drops below about 10, additional alkali metal carbonate can be added to maintain the pH at about 10 to about 11. The heated mixture is then cooled to a temperature of from about 20° C. to about 25° C. Hydrogen peroxide is then added slowly to the mixture to insure the complete oxidation of the tungsten and molybdenum, to tungstates and molybdates respectively. The term tungstates and molybdates includes their respective hydrates. The completeness of oxidation is evident by the yellow color of the liquid phase of the mixture. The liquid phase which contains the tungsten and molybdenum is separated from the solid phase which is essentially sulfur by standard techniques as filtration. The liquid phase which consists of essentially alkali tungstate, alkali molybdate can be treated with a calcium salt such as calcium chloride to precipitate calcium tungstate and calcium molybdate. The sulfur in the solid phase can be upgraded by standard techniques.

To more fully illustrate this invention, the following example is presented. All parts, portions, and percentages are on a weight basis unless otherwise stated.

EXAMPLE

About 200 parts of sulfur bearing material containing about 20% combined tungsten and molybdenum on a dry weight basis and at least about 50% free sulfur are added to about 500 parts of water containing about 50 parts of sodium carbonate monohydrate at a pH of at least about 11, and heated for about 2 to about 6 hours at about 60° C. to about 100° C. to solubilize all the tungsten and molybdenum without dissolving and appreciable amounts of sulfur. After the heating, sodium carbonate is added if necessary to maintain the pH at about 10 to about 11. The mixture is then cooled to below about 30° C. About 150 parts of about 30% hydrogen peroxide are then added slowly to insure complete oxidation of the tungsten and molybdenum to tungstates and molybdates respectively, the completeness of oxidation being evident by a yellow color of the liquid phase. The liquid phase is separated from the solid phase by filtration. The liquid phase contains about 98% of the tungsten and molybdenum and can be treated with calcium chloride to precipitate calcium tungstate and calcium molybdate. The solid phase of the mixture contains mostly sulfur which can be upgraded.

While there has been shown and described what are at present considered the preferred embodiments of the invention, it will be obvious to those skilled in the art that various changes and modifications can be made therein without departing from the scope of the invention as defined by the appended claims.

What is claimed is:

1. A process for recovering soluble tungsten, molybdenum and sulfur values from a sludge comprising from about 30 to about 60 percent free sulfur, from about 2 to about 10 percent by weight tungsten, and from about 2 to about 10 percent by weight molybdenum on a dry basis, said sludge being produced by adding sodium hydrosulfide to a digested tungsten ore solution to precipitate said sludge, said process comprising mixing said sludge with an aqueous solution of sodium carbonate at a pH of about 10 to about 11, reacting said sludge with said sodium carbonate for a sufficient period of time to form a resulting reaction mixture of water soluble tungsten and molybdenum compounds comprising sodium tungstate, sodium thiotungstate, sodium molybdate and sodium thiomolybdate, adjusting the pH of said resulting reaction mixture to about 10 to about 11 with additional sodium carbonate, cooling the resulting reaction mixture to about 20° C. to about 25° C., oxidizing said reaction mixture with an excess of an oxidizing agent that is theoretically required to substantially convert said water soluble tungsten and molybdenum compounds to water soluble sodium tungstate and sodium molybdate and form another reaction mixture comprising a two-phase system of an aqueous phase and a solid phase wherein said tungstates and molybdates are in the aqueous phase and the sulfur values are in the solid phase, and separating said solid phase from said aqueous phase, said liquid phase contains from about 95% to about 98% of the tungsten and molybdenum in said sulfur bearing material.

2. A process according to claim 1 wherein said reaction step is conducted at about 60° C. to about 100° C.

3. A process according to claim 2 wherein said time of reaction is from about 2 to about 6 hours.

4. A process according to claim 3 wherein said oxidizing agent is hydrogen peroxide.

* * * * *